Feb. 28, 1956   A. H. BAKER   2,736,075
PRESTRESSING DOUBLE GLAZING UNITS
Filed Sept. 17, 1949
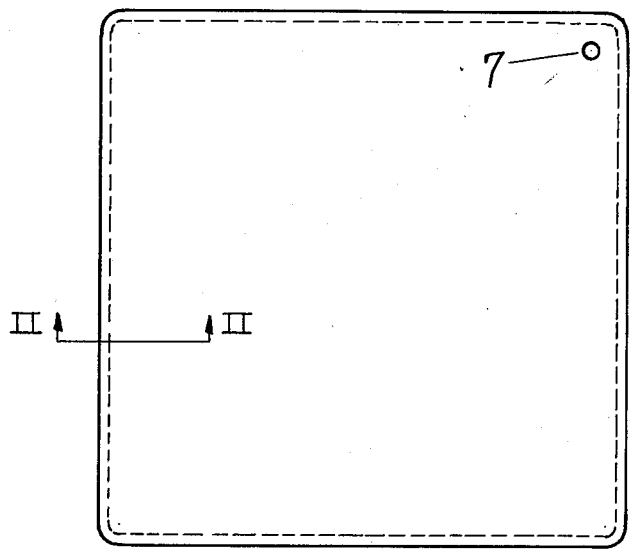
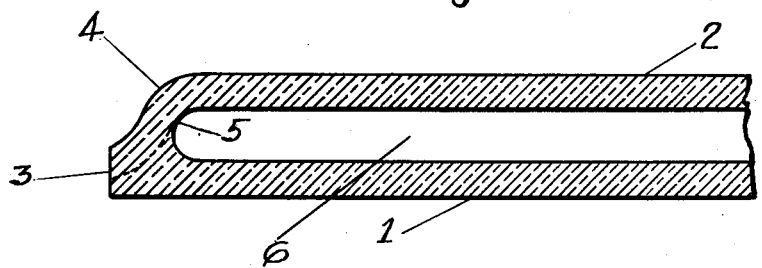
Inventor
ARVID H. BAKER
By Olen E. Bee.
Attorney

United States Patent Office 2,736,075
Patented Feb. 28, 1956

2,736,075
PRESTRESSING DOUBLE GLAZING UNITS

Arvid H. Baker, Port Allegany, Pa., assignor, by mesne assignments, to Pittsburgh Plate Glass Company, Pittsburgh, Pa., a corporation of Pennsylvania Application September 17, 1949, Serial No. 116,308

4 Claims. (Cl. 20—56.5)

This invention pertains to double glazing units of the type wherein portions of one sheet are offset relative to the other to provide an air space between the glass sheets. The glass sheets may have their margins secured together in various ways, the preferred form however is to secure the margins of the sheets together by welding and forming the offset in the sheet while the glass is softened by the heat of welding.

The invention is specifically directed to a process for pre-stressing double glazing units of the character described so as to strengthen the unit at the bends or offsets therein and to the product of the process.

Double glazing units comprising two sheets of glass disposed in spaced superposed relation and their marginal edges connected together are old in the art. Earlier forms of such units are illustrated in Meuler Patent 1,124,778. It is also well known to evacuate the air from the space between the glass sheets and to fill the space with dry air or retain the vacuum. These constructions are illustrated in patents to Kirlin 1,370,974, Yetter 1,793,039, and Hopfield 2,213,395. The latter patent also refers to sealing the unit at a pressure slightly different than atmospheric.

Double glazing units comprised of flat sheets usually experience little difficulty from deflection due to variations in temperature and barometric readings since glass is relatively a rather flexible material and the deflection is spread over a considerable area. In cases where one or both of the sheets are bent to provide air space, stresses in the bend during deflection of the glass from variations in internal or external pressures are of primary importance in the life of the unit. It is this latter problem with which the present invention is concerned.

In the drawings forming part of this specification, Fig. 1 is a plan view of the unit and Fig. 2 is an enlarged partial cross section taken on line 2—2 of Fig. 1. The unit is formed of a substantially flat glass sheet 1 and a second sheet 2 having its marginal portion angularly disposed thereto and terminating in edge portions fused or welded to the corresponding portions of sheet 1. Interiorly of the unit, the inner faces of sheets 1 and 2 are joined by a substantially uniform fillet. The strength of the unit obviously will depend in great part to the uniformity of the inner and outer curved portions forming the connection between the flat portions of sheets 1 and 2 and the fused marginal connection between the sheets.

For purposes of the present invention, the method of sealing the edges as by fusion or any other suitable means is not of importance. Likewise the particular form of the offset, the space between the sheets, and the method of forming the offset in one or both sheets is of no particular importance. It is important, however, that sharp bends and wide variations in cross section of the sheets at these bends be avoided. It will be obvious that sharp bends set up stress concentrations whereas uniform bends of appreciable radius tend to produce uniform flow of stresses. Likewise variations in cross section, even though the bend is uniform in one surface of the sheet, creates areas of weakness. Another important factor in the formation of the units in accordance with the present invention is that the pre-stressing be done after the offsets are formed in the glass; otherwise this pre-stressing under certain conditions may be detrimental rather than beneficial as will hereinafter be explained in detail.

The preferred form of the unit is that shown by the drawing and formed by disposing two sheets of glass of the desired size in slightly spaced superposed relation, heating the margins of sheet 2 until they soften and fuse with the corresponding margins of sheet 1. Thereafter sheet 2 is pulled away from sheet 1 to the desired spacing and the weld completed, all as described in co-pending application of Clever and Phalin, Serial No. 67,696, now abandoned.

Referring now in detail to Fig. 2 of the drawings, the marginal connection between sheets 1 and 2 comprise a jointly fused portion 3, an outer curved portion 4 and an inner curved portion 5 which, with the flat portions of sheets 1 and 2, enclose an air space 6. The space 6 has communication with the exterior of the unit through a pore hole 7.

From inspection of the drawings, it will be obvious that after the space 6 of the unit is filled with air at atmospheric pressure at room temperature and the pore hole 7 sealed, surfaces 4 and 5 of Fig. 2 will be under no stress either compression or tension. However, should either the temperature or barometric pressure at the place of use of the unit vary from that at the place of sealing, both surfaces 4 and 5 will be stressed in different amounts and in different manners. Should the exterior pressure be increased, sheets 1 and 2 will tend to move towards each other, surface 4 will be placed in tension and surface 5 in compression. Also should the external pressure remain constant with that of the time of sealing and the air pressure within space 6 increase due to a rise in temperature, surface 4 will be placed in compression and surface 5 in tension. Obviously these stresses in surfaces 4 and 5 may be computed and the sheets 1 and 2 formed from glass of sufficient strength to safely withstand these stresses. However, the provision of special strength glasses always increase cost and as a result the manufacture of such a unit is economically undesirable. A purpose of pre-stressing is to avoid the need for use of special glasses.

In addition to stresses which are calculable, there are certain other stress variations or potential stress variations to which the unit is subjected during use and which cannot be anticipated. Surface 5 is enclosed within the unit and is not subject to damage, short of destruction of the unit. Surface 4, however, is exposed and is subject to damage during the life of the unit. For example, the surface 4 might be accidentally scratched by the glazier during assembly of the unit and frame, or the surface might be deliberately scratched by some mischievous, negligent or malicious person. The surface 4 might also be damaged by weathering, or in some other manner during the life of the unit. Obviously then, any impairment of the surface 4 will weaken the unit and be a source of stress concentration resulting in possible destruction of the unit from a stress which would not have harmed the unit had the impairment not existed.

Glass has certain characteristics in common with metal. It is elastic within limits, it is readily deflected provided the deflecting force is sufficiently slow in application and will always return to its original shape after the force is removed. It may be welded under heat, bent under heat and otherwise hot worked in many ways like metal. Glass is unlike metal in that when stressed cold beyond its elastic limit it does not take a permanent set, it is broken. It is also well known that glass always begins to break on the tension side of a deformation.

Referring now to Fig. 2 of the drawings, consideration will be given to stresses imposed on surface 4, and surface 5 during normal expected use of the unit as a window in a building, train, refrigerator or other similar uses at temperatures and at barometric pressures other than those prevailing at the time the unit is sealed. Available public records show that 85% of the population in the United States reside and work in areas at an elevation under 3,000 feet and are serviced by railroads which never operate at elevations over 3,000 feet. Therefore the double glazing unit under discussion would have a normal expected use in altitudes between sea level and 3,000 feet. Likewise these same records show probabilities of temperature readings in the unit of +110° F. at 3,000 foot elevation under a summer sun and −20° F. at sea level under adverse conditions. These extremes of climatic conditions would determine extremes of tension stresses on the surface 4 at sea level and on surface 5 at 3,000 foot elevation.

Within the foregoing extremes of altitude and temperature to which a double glazing unit could be subjected, the following results are tabulated:

|  | P. s. i. |
|---|---|
| Barometric pressure at 3,000 ft. altitude | 13.1 |
| Barometric pressure at sea level | 14.7 |
| Barometric pressure at 1,500 ft. altitude | 13.9 |

Unit Size 24" x 24"—Air space 3/16" and glass thickness .118"

| | Sealing Conditions | | Ten. Stress in 4 At sea level and −20° F. | Ten. Stress in 5 At 3,000' alt. and +100° F. |
|---|---|---|---|---|
| | Press., p. s. i. | Temp., °F. | P. s. i. | P. s. i. |
| 1 | 14.7 | −20 | 0 | 5,700 |
| 2 | 13.1 | +110 | 4,200 | 0 |
| 3 | 13.9 | +70 | 2,840 | 1,750 |
| 4 | 13.9 | +30 | 2,000 | 3,000 |
| 5 | 15.0 | +70 | 2,000 | 3,000 |

Upon reference to the foregoing table, it will be apparent that the stresses imposed upon bent glass type double glazing units vary widely with the normally expected fluctuations of pressures and temperatures. From line 1, a unit sealed at atmospheric pressure at sea level and −20° F. would hold exterior surface 4 in compression throughout the entire range of atmospheric pressure decrease and temperature increase up to 3,000 foot altitude and +110° F. and interior surface 5 could reach a maximum tension stress of 5,700 p. s. i. Also upon reference to line 2 of the table, a unit sealed at 3,000 foot altitude and +110° F. when used at sea level and temperature of −20° F. would develop a maximum tension stress of 4,200 p. s. i. in exterior surface 4, which is also undesirable. From line 3 of the table, a unit sealed at atmospheric pressure of an intermediate altitude of 1,500 feet and +70° F. would impose 2,840 p. s. i. tension stress on exterior surface 4 at sea level and −20° F., and 1,750 p. s. i. tension stress on interior surface 5 at 3,000 foot altitude and 110° F.

The above comparisons of the maximum possible stresses imposed upon surfaces 4 and 5 of the bent portions of that unit when sealed at either extreme condition of probable use with that of an intermediate point between these extremes, demonstrate the need for further treatment of the unit to provide a structure which will safely meet all known and reasonably anticipatable conditions of use and abuse. Furthermore, method of treatment of the unit must be such that the unit can be manufactured at any locality within the range of possible use and can thereafter be safely used anywhere within a selected range of conditions.

It is therefore proposed to provide a method for prestressing a unit so that regardless of the place of sealing, within the limits selected, the vulnerable portions of the unit will not be stressed beyond the safe limits of design and anticipatable abuse when the unit is used within the selected limits. This method will (a) provide a selected minimum design safety factor for maximum anticipatable stresses imposed thereon, (b) dispose a major portion of the total tension stresses, likely to be imposed upon the bent portion of the unit, upon the interior surface 5 and (c) have exterior surface 4 under compression during a major portion of the range of temperature changes provided for.

Referring now to Fig. 2 of the drawings and the above table, surface 5 of the bent portion of the unit is sealed inside the unit and protected from the aforementioned types of damage to which surface 4 is exposed. Surface 5 can safely carry a greater stress load than surface 4. It is proposed therefore to proportion the total tension stresses imposed upon the bent portion of the unit so that surface 5 will carry 50% greater tension stress than does surface 4. This may be accomplished either by varying the sealing temperatures or pressures or control of the volume of air filling the unit. Obviously the proportioning of the stresses may be in a different proportion if desired.

For purposes of determining the various allowable stresses imposed on the bent portions of the various sized units under varying temperature and pressure conditions, the following formula may be used. This formula was developed to determine the absolute pressure required to break units of different size and different air spacing.

$P$ = external pressure to break cell
$P_1$ = pressure inside unit when it is sealed
$P_2$ = pressure inside unit just before it breaks
$V_1$ = volume of unit when sealed
$V_2$ = volume of unit just before it breaks
$t_1$ = temperature inside unit when sealed
$t_2$ = temperature inside unit just before it breaks
$q$ = pressure difference between inside and outside of unit
$L$ = length of side of square
$n$ = thickness of air space
$h$ = thickness of glass
$E$ = modulus of elasticity = $10^7$ pounds per sq. in.
$R$ = modulus of rupture
$S$ = maximum stress in pounds per sq. in.
$d$ = center deflection of plate
$F = \dfrac{\text{average deflection}}{\text{center deflection}} = 0.25$ for clamped plate
$a$ = strain constant—0.0138 for sq. clamped plate
$b$ = stress constant—0.0513 for sq. clamped plate When the cell is about to break:

hence $$q = P_2 - P$$
$$P = P_2 - q$$
$$\frac{P_2 V_2}{t_2} = \frac{P_1 V_1}{t_1}$$

$$P_2 = \frac{P_1 V_1 t_2}{V_2 t_1}$$

therefore $$P = \frac{t_2 P_1 V_1}{t_1 V_2} - q$$

$$V_2 = V_1 - L^2 (2dF)$$

$$P = \frac{t_2}{t_1} \frac{P_1 V_1}{V_1 + L^2 (2dF)} - q$$

from Timoshenko "Strength of Materials," vol. II, pp. 506-7-8 (1930)

$$S = \frac{6bqL^2}{h^2}$$

therefore $$q = \frac{Sh^2}{6bL^2}$$

$d = \dfrac{aqL^4}{Eh^3}$ —from Timoshenko as above—page 104 substituting these expressions for $q$ and $d$ $$P = \frac{t_2}{t_1} \frac{P_1 V_1}{V_1 - \frac{FaSL^4}{3Ehb}} - \frac{Sh^2}{6bL^2}$$

Referring now to the above table, line 3, a 24" x 24" unit sealed at substantially mean pressure and temperature conditions would result in 2840 p. s. i. tension in surface 4 at seat level and −20° F., and 1750 p. s. i. tension in surface 5 at 3,000 feet and +110° F. From line 4, a unit of the same size sealed at the same pressure but +30° F. would result in 2,000 p. s. i. tension on surface 4 at sea level and −20° F. and 3000 p. s. i. tension on surface 5 at 3,000 feet and +110° F. This latter is a proportioning of the stresses wherein the maximum tensile stress on the inside of the unit at surface 5 is 50% greater than the maximum tensile stress on the outside surface 4 of the unit. Or, otherwise stated the stresses are reversed from that stated in line 3 in that the greatest tensile stress is on the inside. From line 5 of the table, by retaining the sealing temperature at +70° F. as in line 3 but increasing the sealing pressure from 13.9 to 15.0 p. s. i., the stresses are the same as in line 4, or otherwise stated the stress proportions have been reversed and the maximum tensile stress now is upon the inner protected surface 5.

A further advantage of this method of pre-stressing the unit will be apparent upon comparison of line 3 with line 5. From calculations based upon the above formula, the stress at the bend is approximately 26.5 p. s. i. per degree of temperature change. Hence a unit sealed under conditions of line 5 would have surface 4 under 2000 p. s. i. tension stress at sea level and −20° F. Upon approximately a 75° temperature rise or to approximately +55° F. the surface 4 would then be under a compression stress, and would remain in compression for all temperatures above that.

Again comparing line 3 with line 4, a 24" x 24" unit sealed under conditions of line 3 would have surface 4 under no stress, but as the temperature lowered surface 4 would be under a tension stress for all temperatures below 70° F. Whereas a unit sealed at conditions stated in line 4 would have surface 4 under a compressive stress for all temperature above +30° F. or it may be stated that line 4 has a 40° advantage over line 3. Therefore a unit sealed under conditions of line 4 not only has the maximum stress for extreme conditions reversed from the outside to the inside of the unit when compared to line 3, but also the outer surface 4 is in compression for the major portion of the possible temperature ranges to be encountered, i. e. from +30° F. to 110° F. which is 80° as compared with +30° F. to −20° F. which is only 50°.

This method of pre-stressing may be applied to any sized unit, having any desired space between the sheets of glass and having any desired form of bend in the sheet as well as internal fillet at the weld. The marginal edges of the sheet need not be a fused connection formed by the electric welding process, except that this is the only process presently known to the applicant, producing an internal fillet between the two glass sheets.

The process of pre-stressing the unit may be summarized as follows. After selecting the desired unit size, the spacing between the sheets and the thickness of the sheet, the actual stresses at the bent portions of the sheet are computed, according to the above formula for pre-selected conditions under which the unit will be used. The maximum desired proportioning of the stresses at the extreme conditions of expected use is selected. Sealing temperatures and pressures may then be computed to provide the desired stresses, keeping in mind that a break in a bent piece of glass will always start at the tension side of the bend. Therefore greater stresses may be tolerated at the compression side of the bend at extreme conditions of use in order to provide a unit whose exposed side of the bend may be held under compression for a major portion of the possible temperature range to be encountered at the possible place of use. The temperature range is preferably selected as the variable element since a unit installed at any altitude may possibly be subjected to the full range of selected temperatures, whereas the barometric pressures for sea level and say 3,000 foot altitude show only a range of 13.1 p. s. i. to 14.7 p. s. i. Also each degree of temperature variation in a 24" x 24" unit effects approximately 26.5 p. s. i. of change in stress. The other sized units will have similar proportional changes. Although the variation in pressure within the unit for each degree of temperature change, when plotted does not give a straight line curve, it may be considered so for all practical design purposes. Also each size unit should be designed to provide a factor of safety ratio greater than 1, so that possible stresses upon the glass in excess of those selected, for purposes of computation, can then be tolerated because of the excess strength present in the design.

I claim:

1. A hermetically sealed multiple glazed unit for use as a closure for openings in ground-supported building structures comprising spaced substantially flat sheets of glass fused at their marginal edges, the inside surfaces of the fused edges being in the form of a rounded, substantially semi-circular fillet and the unit containing a gas sealed therein at conditions of pressure and temperature, at least one of which sealing conditions is different from ambient pressure and room temperature at the time of sealing said unit, the glass adjacent the outside surfaces of the fused edges comprising said fillet being stressed in a greater degree of compression and a lesser degree of tension at all conditions of use of said multiple glazed unit in said ground-supported building structures than said glass would be if the gas were sealed within said unit at said ambient pressure and room temperature at the time of sealing said unit.

2. A hermetically sealed multiple glazed unit for use as a closure for openings in ground-supported building structures comprising spaced substantially flat sheets of glass fused at their marginal edges, the inside surfaces of the fused edges being in the form of a rounded, substantially semi-circular fillet and the unit containing a gas sealed therein at conditions of pressure and temperature, at least one of which sealing conditions is different from ambient pressure and room temperature at the time of sealing said unit, the glass adjacent the outside surfaces of the fused edges comprising said fillet being stressed in a greater degree of compression and a lesser degree of tension at all conditions of use of said multiple glazed unit in said ground-supported building structures than said glass would be if the gas were sealed within said unit at said ambient pressure and room temperature at the time of sealing said unit, and the glass adjacent the outside surfaces of the fused edges comprising said fillet being stressed in compression for the major portion of the temperature range of said conditions of use between −20° F. and 110° F.

3. A hermetically sealed multiple glazed unit for use as a closure for openings in ground-supported building structures comprising spaced substantially flat sheets of glass fused at their marginal edges, the inside surfaces of the fused edges being in the form of a rounded, substantially semi-circular fillet and the unit containing a gas sealed therein at conditions of pressure and temperature, at least one of which sealing conditions is different from ambient pressure and room temperature at the time of sealing said unit, the glass adjacent the outside surfaces of the fused edges comprising said fillet being stressed in a greater degree of compression and a lesser degree of tension at all conditions of use of said multiple glazed unit in said ground-supported building structures than said glass would be if the gas were sealed within said unit at said ambient pressure and room temperature at the time of sealing said unit, and the glass at the fused marginal edges of said unit being stressed with the maximum tensile stress on the glass adjacent the outside surfaces of the fused edges comprising said fillet lower than the maximum tensile stress on the glass adjacent the inside surfaces of said fused edges as said multiple glazed unit is exposed to conditions of use between minus 20° F. at sea level and 110° F. at 3000 feet elevation.

4. In the method of making a hermetically sealed multiple glazed unit for use as a closure for openings in ground-supported building structures comprising spaced substantially flat sheets of glass fused at their marginal edges, the inside surfaces of the fused edges being in the form of a rounded, substantially semi-circular fillet, the step which comprises sealing a gas within said unit at conditions of pressure and temperature, at least one of which sealing conditions is different from ambient pressure and room temperature at the time of sealing said unit, the glass adjacent the outside surfaces of the fused edges comprising said fillet being stressed in a greater degree of compression and a lesser degree of tension at all conditions of use of said multiple glazed unit in said ground-supported building structures than said glass would be if the gas were sealed within said unit at said ambient pressure and room temperature at the time of sealing said unit.

References Cited in the file of this patent

UNITED STATES PATENTS

| | | |
|---|---|---|
| 1,124,778 | Meuler | Jan. 12, 1915 |
| 2,030,869 | Haven | Feb. 18, 1936 |
| 2,083,622 | Summers | June 15, 1937 |
| 2,094,381 | Slayter | Sept. 28, 1937 |
| 2,213,395 | Hopfield | Sept. 3, 1940 |
| 2,235,680 | Haven et al. | Mar. 18, 1941 |
| 2,255,238 | Willis | Sept. 9, 1941 |
| 2,344,630 | Mylchreest | Mar. 21, 1944 |
| 2,389,360 | Guyer et al. | Nov. 20, 1945 |
| 2,398,371 | Gerspacher | Apr. 16, 1946 |
| 2,521,048 | Day | Sept. 5, 1950 |

FOREIGN PATENTS

| | | |
|---|---|---|
| 429,751 | Great Britain | June 6, 1935 |